United States Patent [19]
Omaki et al.

[11] Patent Number: 4,870,437
[45] Date of Patent: Sep. 26, 1989

[54] PHOTOGRAPHIC CAMERA

[75] Inventors: Takanobu Omaki, Sannan; Junichi Tanii, Sakai; Sadafusa Tsuji; Maki Yamashita, both of Osaka, all of Japan

[73] Assignee: Minolta Camera Kabushiki Kaisha, Osaka, Japan

[21] Appl. No.: 270,460

[22] Filed: Nov. 8, 1988

Related U.S. Application Data

[63] Continuation of Ser. No. 946,489, Dec. 24, 1986, abandoned.

[30] Foreign Application Priority Data

| Dec. 27, 1985 | [JP] | Japan | 60-298912 |
| Jan. 16, 1986 | [JP] | Japan | 61-4316 [U] |
| Jan. 17, 1986 | [JP] | Japan | 61-8756 |
| Feb. 3, 1986 | [JP] | Japan | 61-21719 |
| Feb. 28, 1986 | [JP] | Japan | 61-45089 |

[51] Int. Cl.$^4$ .......................... G03B 17/08; G03B 1/00
[52] U.S. Cl. ........................................ 354/64; 354/214
[58] Field of Search .......... 354/64, 275, 288, 204–206, 354/212–214

[56] References Cited

U.S. PATENT DOCUMENTS

| 2,059,827 | 11/1936 | Teague | 354/275 |
| 2,592,158 | 4/1952 | Kirby et al. | 354/275 X |
| 3,589,637 | 6/1971 | Wagner | 354/275 X |
| 4,274,726 | 6/1981 | Yoneyama et al. | 354/173.1 |
| 4,419,001 | 12/1983 | Tominaga et al. | 354/214 X |
| 4,455,074 | 6/1984 | Wong et al. | |

FOREIGN PATENT DOCUMENTS

| 3045240 | 7/1982 | Fed. Rep. of Germany | 354/275 |
| 4225204 | 12/1942 | Japan . | |
| 131926 | 10/1979 | Japan | 354/288 |
| 60933 | 5/1980 | Japan | 354/275 |
| 111134 | 6/1984 | Japan | 354/275 |

*Primary Examiner*—Donald A. Griffin
*Attorney, Agent, or Firm*—Watson, Cole, Grindle & Watson

[57] ABSTRACT

A photographic camera having in a patrone chamber for loading a film patrone a rotational drive mechanism for rotating a film in a direction for loosening at least the film peripheral relative to an axis along a patrone axis and extending toward a leading edge of the film and a film insertion mechanism for inserting the leading edge of the film into a film outlet opening extending from the patrone chamber to a film exposure section with the rotation of the film. With this construction, when the film patrone is accommodated in the patrone chamber, wherever the leading edge of the film may be placed about the patrone axis, the film insertion mechanism rotates the film about the axis along the patrone axis thereby to guide the leading edge of the film to be inserted into the film outlet opening extending to a manually-operated film winding-up mechanism or to an automatic film winding-up device.

3 Claims, 10 Drawing Sheets

Fig. 3
Fig. 8A
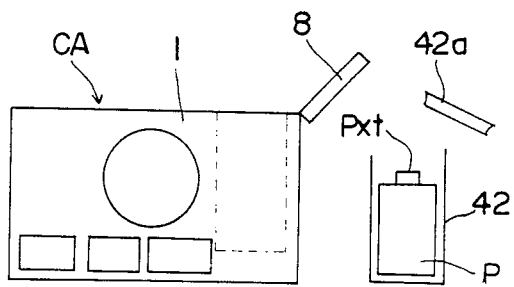
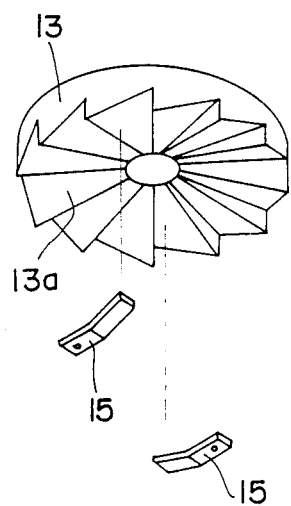
Fig. 8B
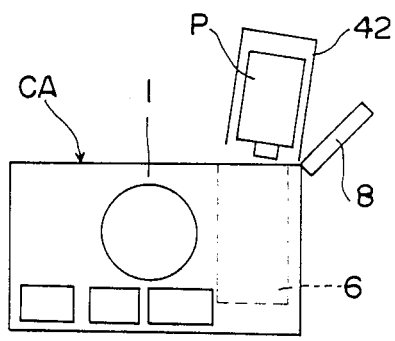
Fig. 4
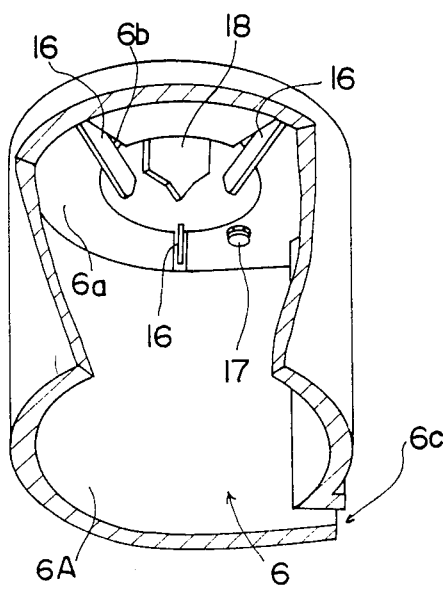
Fig. 8C
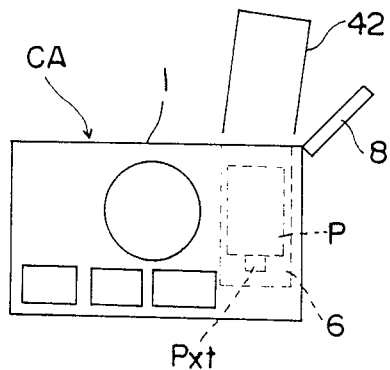

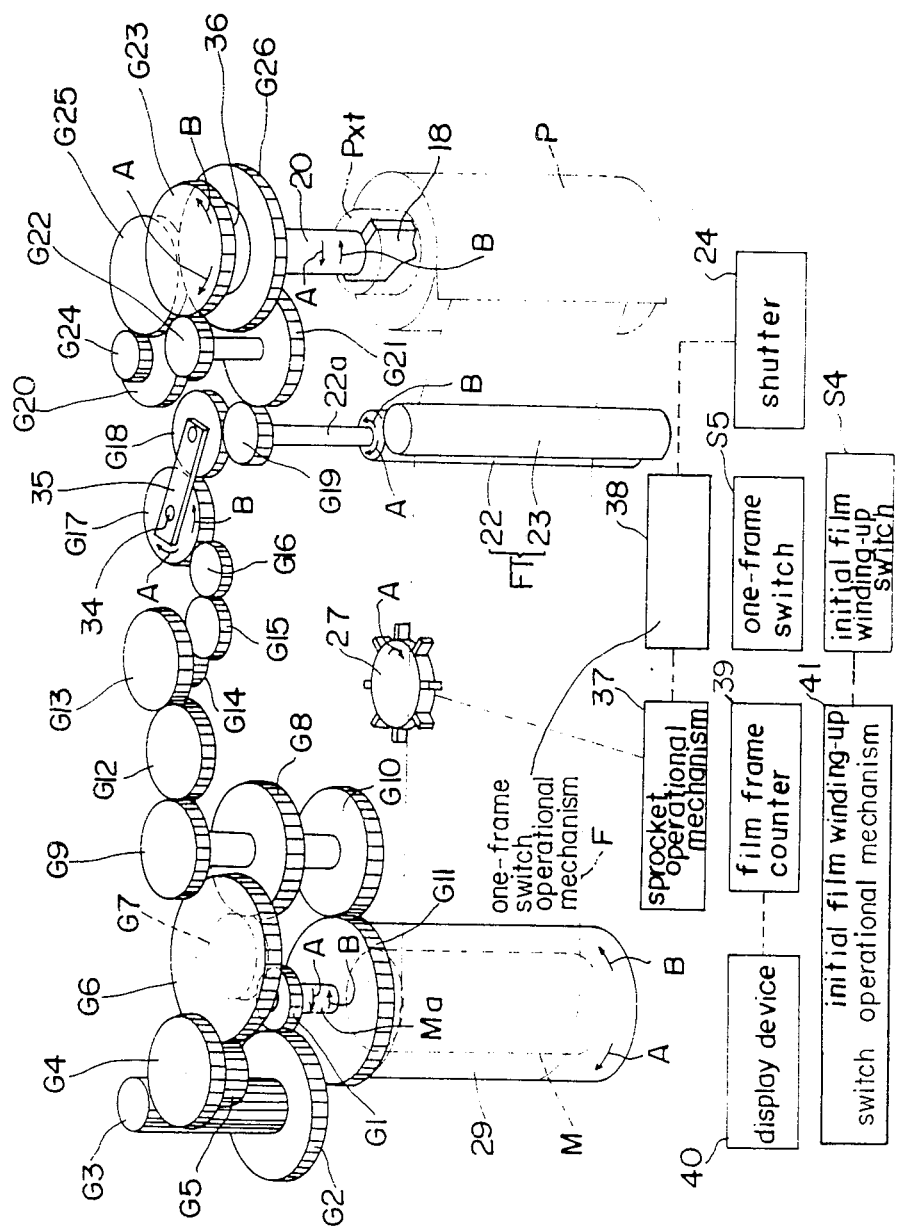

PHOTOGRAPHIC CAMERA

This application is a continuation of application Ser. No. 946,489, filed Dec. 24, 1986, now abandoned.

BACKGROUND OF THE INVENTION

1. Field of the Invention

The present invention relates to a photographic cameras, and more particularly to a photographic camera which contains a drive motor for advancing and rewinding the film loaded therein.

2. Description of the Prior Art

A conventional photographic camera provides a patrone chamber for accommodating a film patrone. When loading film, a back lid of the camera is opened and then the film patrone is positioned in the patrone chamber. Thereafter, a the film projecting from the film patrone is gripped and then manually positioned in a passage extending from a film outlet opening of the patrone chamber to a film exposure section. After this, by manually activating a winding-up lever or by operating an automatic film winding-up device by closing the back lid or by other methods, the film is loaded.

However, with the above-described prior art methods, the film loading operation is troublesome since the user needs to set the film at a predetermined position or insert the same into the film outlet opening. This problem occurs not only with a camera in which the film is manually wound up but also with a camera having an automatic film winding-up device.

SUMMARY OF THE INVENTION

Therefore, it is one object of the present invention to facilitate the loading operation of the film accommodated in the film patrone.

It is another object of the present invention to enable a rewinding operation of the film accommodated in the film patrone.

It is still another object of the present invention to reduce the size of the patrone chamber.

A photographic camera according to the present invention comprises a patrone chamber for loading a film patrone accommodating a film wound about a patrone axis and a film exposure section for exposing the film taken out of the film patrone, the patrone chamber including a rotational drive mechanism for rotating the film in a direction for loosening at least the peripheral portion of the film relative to an axis along the patrone axis and extending toward a leading edge of the film and further including a film insertion mechanism for inserting the leading edge of the film into a film outlet opening extending from the patrone chamber to the film exposure section with the rotation of the film patrone.

With this construction, wherever the leading edge of the film projecting from the film patrone may be positioned about the patrone axis inside the patrone chamber, the film is rotated about the axis along the patrone axis and the leading edge of the film is inserted into the film outlet opening extending toward the manually-operated film winding-up mechanism or toward the automatic film winding-up device. Therefore, the loading operation of the film into the camera will be considerably facilitated since the user need not set a film to the predetermined position nor insert the same into the film outlet opening; the user only needs to position the film patrone into the patrone chamber.

According to a preferred embodiment of the present invention, there is provided a photographic camera further comprising a film rewinding mechanism for rewinding the film into the film patrone by rotating the patrone axis in a direction for rewinding the film which is opposite to the direction for loosening the film and a film patrone reverse rotation-preventing mechanism for preventing the film patrone from being rotated in the direction for rewinding the film in the course of the film rewinding operation.

With this additional construction, since the patrone reverse rotation-preventing mechanism prevents the film patrone from being rotated in the direction for rewinding the film while a film rewinding axis is rotated for rewinding the film, the rotation of the patrone axis driven by the film rewinding axis rewinds the film into the film patrone.

According to another preferred embodiment of the present invention, there is provided a photographic camera characterized in that the patrone chamber has a cross section thereof which is larger than a circle outwardly contacting the film patrone and at the same time smaller than a circle having a radius extending from a center of the patrone axis to an outermost edge of the film patrone and that the rotational drive mechanism eccentrically rotates the film patrone inside the patrone chamber and that the patrone chamber is formed by being surrounded substantially with a guide face for guiding the leading edge of the film to the film outlet opening with the rotation of the film patrone.

With these characterizing features, since the patrone rotation drive mechanism is capable of rotating the film patrone eccentrically relative to the patrone chamber, if the inner radius of the patrone chamber is formed slightly longer than a maximum radial width of the film patrone by conveniently setting an amount of the eccentricity, the film patrone is permitted to rotate inside the patrone chamber. Therefore, compared with a construction in which the film patrone is rotated uneccentrically relative to the patrone chamber, the patrone chamber may be formed compact.

Further objects and advantages of the present invention will be apparent from the following description, reference being had to the accompanying drawings wherein preferred embodiments of the present invention are clearly shown.

BRIEF DESCRIPTION OF THE DRAWINGS

In the drawings:

FIG. 3 is a perspective view of a rotation preventing plate in the photographic camera of FIG. 1 and the plate spring cooperable therewith;

FIG. 4 is a perspective view of a top portion of the patrone chamber;

FIG. 6 is a perspective view of a drive transmission mechanism;

FIGS. 8A through 8C are schematic views illustrating a film patrone loading operation;

DESCRIPTION OF THE PREFERRED EMBODIMENTS

Preferred embodiments of the present invention will be particularly described hereinafter with reference to the accompanying drawings.

Figure 2:
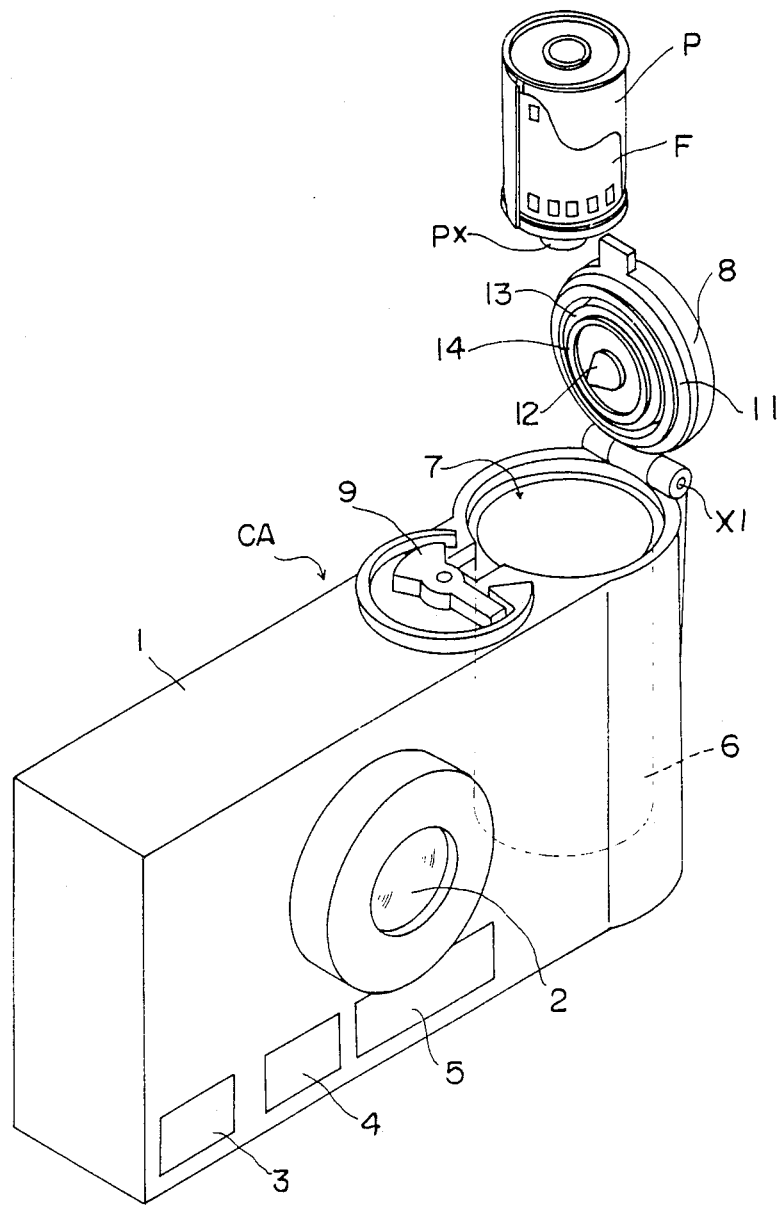
FIG. 2 is perspective view of the photographic camera according to the present invention when inverted and showing a film patrone oriented for insertion into the patrone chamber therein.

FIG. 2 is a perspective view of a camera CA of the present invention when inverted.

This camera CA comprises of a photographic lens 2 disposed substantially centrally of a front face of a body 1, a flash window 3, a view-finder window 4, and an object range-measuring window 5 acting also as a light-receiving window for detecting an object brightness.

The body 1 includes at an end portion of a lower face thereof a substantially circular opening 7 for a patrone chamber 6. This patrone chamber 6 is adapted to accommodate a film patrone P (the film patrone type 135) with a projecting end of a patrone axis Px thereof placed upwardly (downwardly in FIG. 2). A lid 8 for closing the opening 7 of the patrone chamber 6 is attached to the body 1 to be rotatable about an axis X1. A locking lever 9 for locking the lid 8 at its closed position is disposed adjacent the opening 7.

This locking lever 9 is supported to pivot between the locking position for locking the lid 8 at its closed position and a locking release position. At the locking position shown in FIG. 1, the locking lever 9 closes with its functioning portion 9a a locking switch S3 accommodated in the camera CA and normally opened. A shaft 9b of the locking lever 9 mounts thereon an O-ring 10 disposed between the body 1 and the shaft 9b for sealing the inside of the camera CA against water penetration. A stopping member may be independently provided for stopping the locking lever 9 at the locking position.

An inner wall of the lid 8 supports an annular sealing member in the form of an O ring 11. When the lid 8 is placed at the closed position, this O-ring is pressed between the lid 8 and the opening 7 of the body 1, thereby maintaining the patrone chamber 6 water-tight.

The opening 7 for loading the film patrone P into the patrone chamber 6 is formed only in an end face of the patrone chamber 6 in the direction of the patrone axis Px. That is to say, the film patrone P loaded in the patrone chamber 6 is rotatably driven as will be more particularly described later. Further, with this rotation of the film patrone P, the leading edge of the film F projecting from the film patrone P is guided by the inner wall 6A that forms the patrone chamber 6 and then is automatically inserted into the film outlet opening 6c extending from the patrone chamber 6.

Therefore, the opening 7 for loading the film patrone P into the patrone chamber 6 may be formed compact since the opening 7 need only permit the film patrone P to pass therethrough in its longitudinal direction. Further, it is also possible to form short the peripheral length of the opening thereby to provide a reliable water-tight construction. Thus, by shortening the peripheral length to be sealed, the possibility of deterioration and damage in the sealing member may be reduced, and at the same time, by reducing the area of the opening, the lid for the opening may also by formed compact with a smaller area, whereby a leak resulting from warping of the lid will be less likely to occur.

As a result, it is also possible to provide a water-resistant camera having a more reliable water-tightness for the patrone chamber and a reduced possibility of a water leakage accident.

Also, since portions of the peripheral edge of the opening 7 and the lid 8 for holding the O-ring 11 therebetween are adapted to be placed on substantially the same plane as the O-ring 11 when the lid 8 is closed, thereby rendering the water-tight construction of the patrone chamber 6 two dimensional, a reliable water-tightness may be obtained.

Also, the inner wall of the lid 8 erectly carries thereon a shaft 8a, which rotatably mounts at a top end thereof a conical guide member 12. This guide member 12 engages a cylindrical patrone axis Pxb which is not protruding (will be referred to as lower patrone axis hereinafter) with the film patrone P accommodated in the patrone chamber 6 and regulates the radial positioning of the film patrone P.

Further, the shaft 8a of the lid 8 rotatably carries thereon a rotation-preventing plate 13 to be rotatable thereon. This rotation preventing plate 13 includes at its face (upper face in the same figure) an annular elastic frictional member 14 which comes into contact with a lower end face Pb of the film patrone P accommodated in the patrone chamber 6 with the lid 8 placed at its closed position. A lower face in the same figure of the rotation-preventing plate 13 defines sawtoothed projections 13a as shown in FIG. 3.

On the other hand, a pair of plate springs 15 are attached to the inner wall of the lid 8 and free end sides of the plate springs 15 are respectively in urged contact with the projections 13a of the rotation-preventing plate 13. This permits the rotation-preventing plate 13 to be urged upwardly by the plate springs 15 and at the same time prevents the plate 13 from being rotated counterclockwise as leading edges of the plate springs 15 come into urged contact with upright faces of the projections 13a.

That is to say, the film patrone, P, when accommodated in the patrone chamber 6, will not be rotated in the direction of film rewinding operation unless a force is applied thereto which exceeds the frictional force between the elastic frictional member 14 and the lower end face Pb of the film patrone P.

Figure 5A:
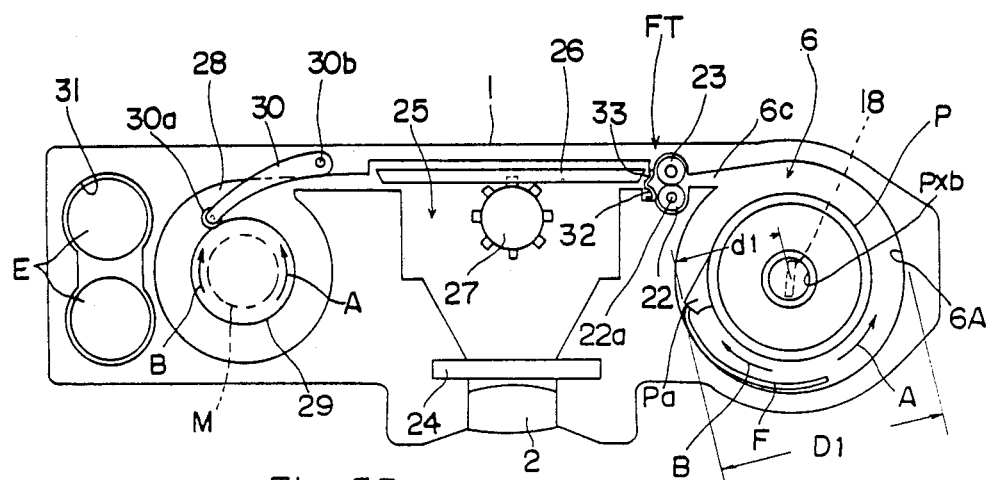
FIGS. 5A through 5C are top views showing an inner construction of the photographic camera.
Figure 5B:
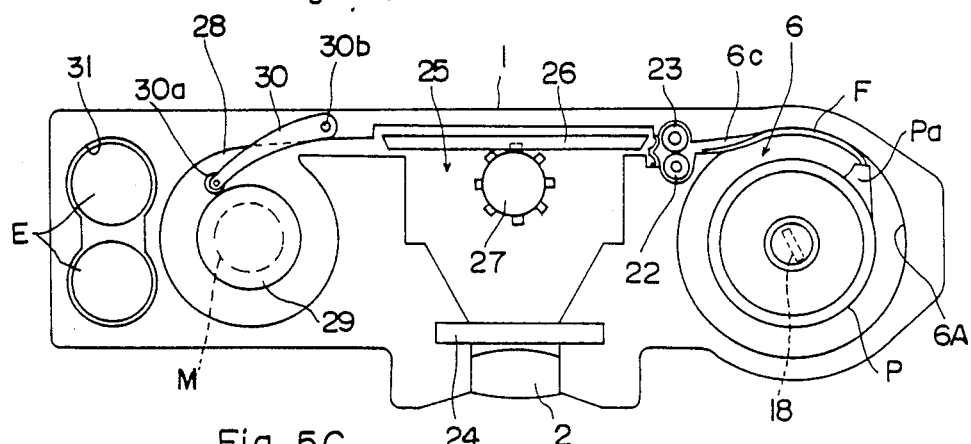
Figure 5C:
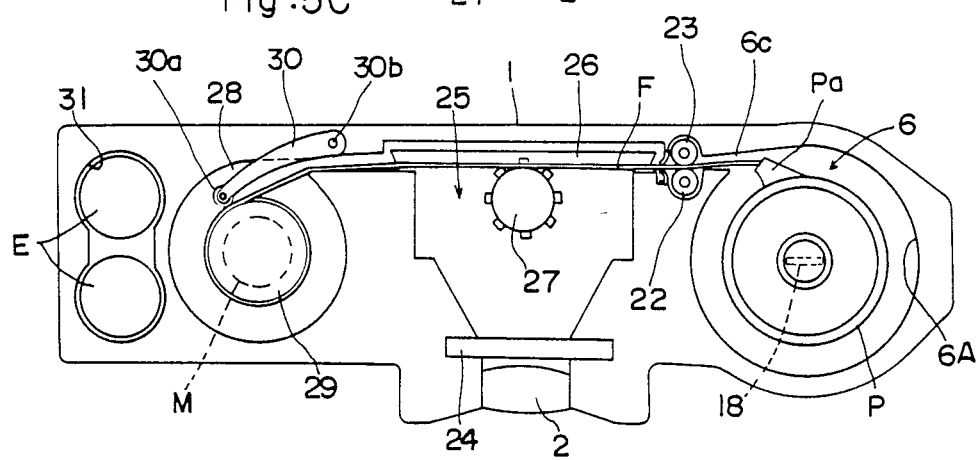

As shown in FIGS. 5A through 5C, the patrone chamber 6 has a substantially cylindrical form with an inner radius capable of permitting the film patrone P having a film exit slit Pa to rotate about the patrone axis Px. More particularly, if the inner radius of the patrone chamber 6 is D1 and a distance from the center of the film patrone P to the outermost edge of the film exit slit Pa is d1, then;

$$D1 > 2d1$$

As shown in FIG. 4, the patrone chamber 6 includes at a top section thereof three guide levers 16, a patrone detection pin 17 and a drive shaft 18 which transmits a rotational drive to the patrone axis Px as engaged into a cylindrical patrone axis Pxt (will be referred to as upper patrone axis hereinafter) of the projecting side of the film patrone P.

The three guide levers 16 are disposed peripherally of the patrone chamber 6 with each separated by 120°. Also, the guide levers 16 are respectively pivotable between a raised position indicated by an alternate long and two short dashes in FIG. 1 and raised by approximately 50° from the ceiling face 6a of the patrone chamber 6 and a recessed position recessed into a groove 6b defined in the ceiling face 6a and the guide levers 16 are respectively urged toward the raised position by means of a spring (not shown).

In operation, these guide levers 16 are moved toward the recessed position against the urging force of the spring by coming into contact with the upper end face Pt about the upper patrone axis Pxt as the loaded film patrone P is inserted into the patrone chamber 6 and at the same time push the upper patrone axis Pxt toward a center of the patrone chamber 6 through a leading edge thereof, thereby to guide the upper patrone axis Pxt to come into engagement with the drive shaft 18. It is to be noted here that the number of guide levers 16 is not limited to three but may be conveniently varied so as not to cause trouble in guiding the upper patrone axis Pxt of the film patrone P to the center of the patrone chamber 6.

The patrone detection pin 17 is freely projectable and retractable between a projecting position extending from the ceiling face 6a of the patrone chamber 6 into the patrone chamber 6 and a recessed position recessed from the patron chamber 6 and is urged toward the projecting position by a spring 19. In operation, this patrone detection pin 17 is moved to the recessed position as urged by the upper end face Pt of the film patrone P being inserted into the patrone chamber 6 thereby to close a film loading switch S2 which is opened normally.

The drive shaft 18 includes a projecting portion 18a, a plate portion 18b having a width engageable into the upper patrone axis Pxt and a cylindrical portion 18c outwardly engaging a drive shaft 20 connected to a gear G26. Further, a pin 20a attached to a peripheral face of the drive shaft 20 in engagement with a longitudinally elongate slot 18d defined in the cylindrical portion 18c. Thus, the drive shaft 18 as a whole is axially slidable relative to the drive shaft 20 and at the same time is rotatable in unison therewith. Also, this drive shaft 18 is urged by a spring 21 toward the film patrone P (downwardly in the same figure). The plate portion 18b transmits power to the patrone axis Px by coming into engagement with a groove (not shown) defined inside the upper patrone axis Pxt.

As shown in FIGS. 5A through 5C, the camera CA accommodates therein, in addition to the patrone chamber 6, a film advance roller 22 and a pressure contact roller 23 both of which constitute a film advance mechanism FT, the photographic lens 2, a shutter 24, a film exposure section 25, a film pressure plate 26, a film-frame counting sprocket 27, a spool chamber 28, a spool 29 incorporating a motor M, a film guide lever 30 and a battery chamber 31 for accommodating batteries E.

The patrone chamber 6 defines in its side wall axially of the film patrone P a film outlet slit 6c. Both the film advance roller 22 and the pressure contact roller 23 have peripheral walls thereof formed of elastic rubber material and are disposed adjacent the film outlet slit 6c. The film advance roller 22 is secured to a shaft 22a driven by the motor M whereas the pressure contact roller 23 is rotatably supported and in urged contact with the film advance roller 22, whereby with a rotation of the film advance roller 22 a film F bound between the rollers 22 and 23 is moved rightwardly or leftwardly in accordance with a direction of the rotation.

The film-frame counting sprocket 27 is rotated as engaged with a perforation of the film F being moved, thereby to drive a film frame counter 39 as will be described later and at the same time to operate a one-frame switch S5 which is closed with a completion of a one-frame film advance. The film guide lever 30 includes a roller 30a rotatably mounted on a top end portion thereof thereby to be rotatably attached on an attaching shaft 30b and at the same time the roller 30a is placed in urged contact with a peripheral wall of the spool 29 by means of a spring (not shown). The film guide lever 30 permits a leading edge of the film F which has reached the spool chamber 28 to advance counterclockwise peripherally of the spool 29 and at the same time holds the film F wound around the spool 29 thereby to enable a reliable film winding operation.

The photographic lens 2 is adapted to provide an automatic focusing operation on an object to be photographed by using a lens drive apparatus (not shown) based on information about a distance to the object detected by a distance-measuring device (not shown). The shutter 24 is formed as a so-called program lens shutter which varies an aperture with a lapse of time and permits an exposure control device (not shown) to automatically control the exposure based on information about brightness of the object detected by a light-measuring device (not shown).

Light-blocking means including a pair of light-blocking members 32 and 33 are provided on the sides of the film advance roller 22 and the pressure contact roller 23. These light-blocking members 32, 33 are formed of elastic material such as rubber having light-blocking characteristics and are attached to the sides with top end portions thereof in urged contact with each other. In cooperation with the construction of the opening 7 which opens only the patrone chamber 6 when the lid 8 is at the opened position, the light-blocking means, which is disposed closer to the patrone chamber than to the film exposure section, prevents light leaked from the film outlet slit 6c of the patrone chamber 6 from coming into the film exposure section 25 and into the spool chamber 6. Therefore, even if the lid 8 is unintentionally opened when some film frames have been exposed and the film rewinding operation has not yet been carried out, the light-blocking members 32, 33 protect the exposed frames from double exposure.

Further, it is also possible to enhance the light-blocking effect by sticking a light-blocking fiber to the mutual contact faces of the light-blocking members 32, 33.

A drive power transmission mechanism for transmitting the drive power of the motor M to the drive shaft 18 for the film patrone P, the film advance roller 22 and to the spool 29, will be described next.

As shown in FIG. 6, a gear G1 secured to a rotational shaft Ma of the motor M is operatively connected to a gear G8 through a speed reduction gear train including gears G2, G3, G4, G5, G6, G7. An upper and lower pair of gears G9 and G10 are secured to the gear G8 to be rotatable in unison together with. The lower gear G10 is in mesh with a gear G11 rotatable in unison with the spool 29.

That is to say, as the gear G1 is rotated with the rotation of the motor M, the spool 29 is rotated in the opposite direction to the rotational direction of the motor M.

On the other hand, the upper gear G9 rotatable in unison with the gear G8 is secured to a sun gear G17 through gears G12, G13, G14, G15, G16. A planetary gear G18 meshing the sun gear G17 is rotatably mounted on a lever 35 rotatably supported by a rotational shaft 34 of the sun gear G17. When the sun gear G17 is rotated in a direction denoted by 'A' in the same figure, the planetary gear G18 is moved to come into mesh with a gear G19; whereas, when the sun gear G17 is rotated in a direction denoted by 'B' in the figure, the planetary gear G18 is moved to come into mesh with a gear G20.

The gear G19 is secured to the drive shaft 22a of the film advance roller 22 and at the same time is connected to a gear G23 through gears G21 and G22. This gear G23 is connected through a one-way clutch 36 to the drive shaft 18 for the film patrone P. The one-way clutch 36 is adapted to transmit its rotational output to the drive shaft 18 only when the gear G23 is rotated in the direction 'A' in the figure. On the other hand, the gear G20 is connected to a gear G26 secured to the drive shaft 20 through gears G24, G25.

Working of the drive power transmission mechanism having the above-described construction will be particularly described next.

When the rotational shaft Ma of the motor M is rotated in the direction denoted by 'B' in the figure, the spool 29 is rotated in the direction 'A', i.e., the direction for winding up the film F. When the sun gear G17 is rotated in the direction 'A' thereby permitting the planetary gear G18 to come into mesh with the gear G19, the film advance roller 22 is rotated in the direction 'A', i.e., the direction for advancing in cooperation with the pressure fixing roller 23 the film F toward the spool chamber 28 side. Further, the drive shaft 18 for the film patrone P is rotated in the direction 'A' to drive the patrone axis Px in a direction for loosening the film F.

Accordingly, the film F accommodated in the film patrone P is transported leftwardly in the figure by the film advance mechanism FT to go through the film exposure section 25 to the spool chamber 28 and then the film F is wound about the outer periphery of the spool 29. It is to be noted here that the film transportation speed of the film advance mechanism FT is adapted to be faster than a film winding-up speed of the spool 29 and than a film loosening speed of the patrone axis Px.

Therefore, even if the windingup speed increases as the winding-up operation of the film F about the spool 29 proceeds, the film F is not wound up at a greater speed than the transportation speed of the film advance mechanism FT, thereby to protect the film F from an abnormally strong winding-up tension.

Also, it is possible to construct the drive transmission mechanism such that the winding-up speed of the film F by the spool 29 is set the fastest, the transportation speed of the film F by the film advance mechanism is set the second fastest and the film loosening speed of the patrone axis Px is set the slowest. In this case, the spool 29 is rotated at a faster speed than the film transportation speed. However, there will occur no inconvenience if a friction mechanism is provided in the spool 29 or in the drive transmission mechanism whereby the spool 29 is frictionally driven. This is because the increase of the winding-up speed caused by the proceeding winding-up operation of the film F on the spool 29 is offset by the friction mechanism.

On the other hand, when the rotational shaft Ma of the motor M is rotated in the direction 'A', the spool 29 is rotated in the direction 'B'. Also, as the sun gear G17 is rotated in the direction 'B' thereby permitting the the planetary gear G18 to come into mesh with the gear G20, the drive shaft 18 for the film patrone P is rotated in the direction 'B' to drive the patrone axis Px in the direction for rewinding the film F. The rotation of the drive shaft 18 in the direction 'B' is transmitted through the unidirectional clutch 36 to the gear G23 and then through the gears G22, G21 to the gear G19 thereby to drive the drive shaft 22a of the film advance roller 22 in the direction 'B'.

Accordingly, the film F wound around the spool 29 is transported rightwardly in the same figure by the film advance mechanism FT and then is rewound into the film patrone P. That is to say, the drive shaft 18 acts also as a film rewinding shaft RS for rotating the patrone axis Px in the direction for rewinding the film F.

The film-frame counting sprocket 27 is adapted to be driven by engaging the perforation of the film F being transported. This film-frame counting sprocket 27 is operatively connected through a sprocket operational mechanism 37 to a one-frame switch operational mechanism 38 and to a film frame counter 39.

This one-frame switch operational mechanism 38 is operatively connected to the shutter 24 and is adapted to close the one-frame switch S5 with a completion of one-frame film exposure operation and is adapted to open the one-frame switch S5 when the sprocket operational mechanism 37 detects a completion of one-frame film winding-up operation as the film frame counting sprocket 27 is driven.

The film frame counter 39 varies a display on a display device 40 in response to an action of the sprocket operational mechanism 37 and also opens or closes an initial film winding-up switch S4 through an initial film winding-up switch operational mechanism 41. This initial film winding-up switch operational mechanism 41 closes the initial film winding-up switch S4 until the film frame counter 39 detects that a first frame of the film F has reached the film exposure section 25 and opens the switch S4 when the film frame counter 39 has detected the first frame of the film F.

Next, a motor drive circuitry shown in FIG. 7 adapted for driving the motor M for the transportation of the film F will be described.

Figure 1:
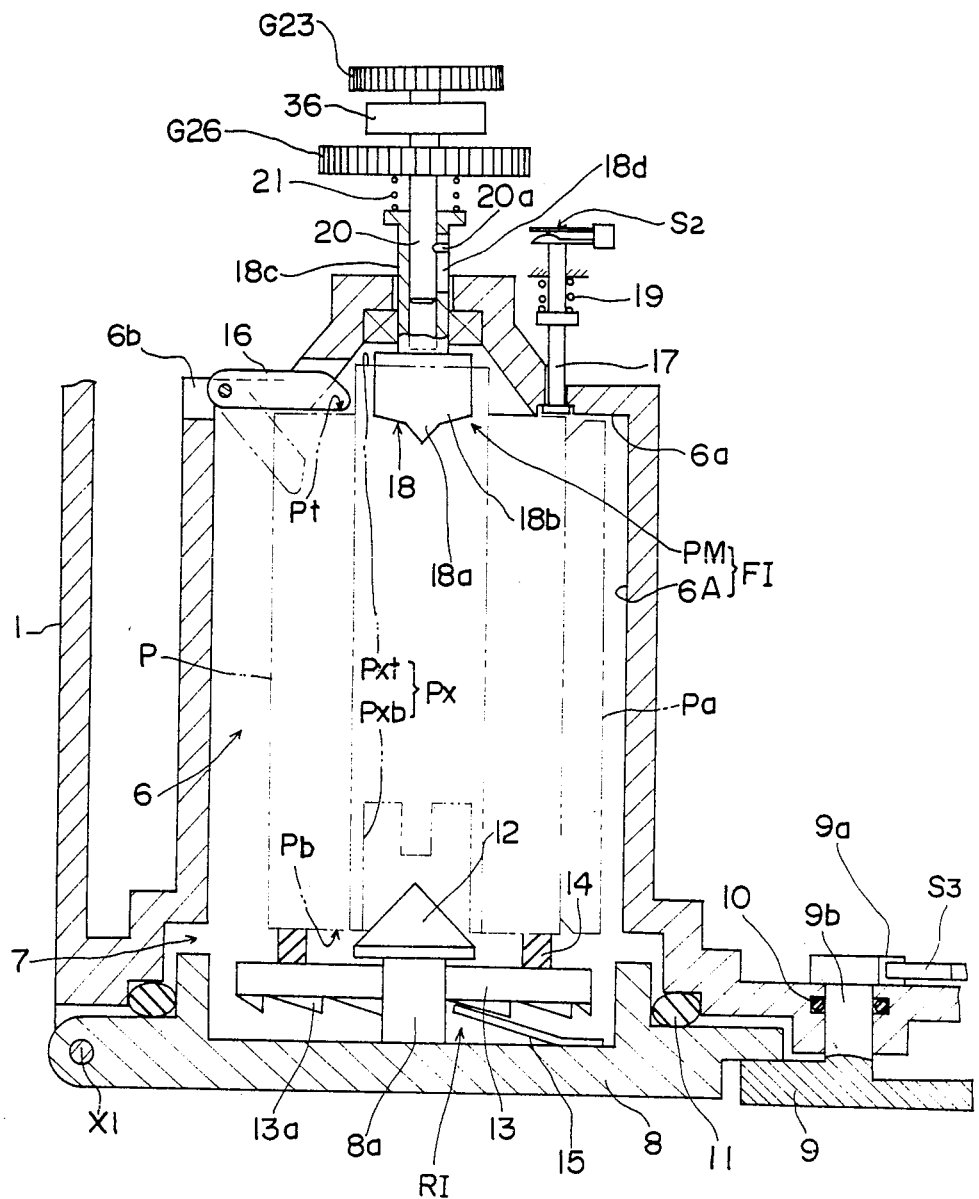
FIG. 1 is a vertical section of a patrone chamber of a photographic camera according to one embodiment of the present invention.

Referring to this circuitry, a reference mark S1 stands for a main switch, S2 for a film loading switch shown in FIG. 1 closed when the film patrone P is loaded into the patrone chamber 6, S3 for the rocking switch shown in FIG. 1 closed when the locking lever 9 is placed at the locking position, S4 for the initial film winding-up switch shown in FIG. 6 closed until the film frame counter 39 has counted the first frame after an initialized state thereof, S5 for the one-frame switch shown in FIG. 6 opened with the completion of one-frame film winding-up operation and closed when the exposure operation is completed, S6 for a rewinding switch closed when a film rewinding lever (not shown) is placed at a rewinding position thereof and S7 for a rewinding completion switch closed when the rewinding operation of the film F is completed.

The motor M is connected to the batteries E as a power source thereof through a pair of relay switches RL1 and RL2. These relay switches RL1 and RL2 are respectively rendered operative as becoming conductive with transistors T1 and T2 provided separately therefor and connect the motor M to the power source batteries E. Further, when neither of these relay switches RL1 and RL2 are operative, terminals of the motor M are short-circuited thereby to stop the motor M. Bases of the transistors T1 and T2 are independently connected to collectors of transistors T3 and T4, whereby when the transistors T3 and T4 are turned 'ON', the transistors T1 and T2 are turned 'OFF' thereby to render the corresponding relay switches RL1 and RL2 inoperative.

An AND circuit AN1 has its one input terminal connected to a connecting point between the film loading switch S2 connected in series to the rocking switch S3 and a pull-down resistor R1 and has the other input terminal connected to a connecting point between the initial film winding-up switch S4 and a pull-down resistor R2. That is to say, the AND circuit AN1 outputs an 'H' (high) signal when all of the three switches S3, S4, S5 are closed.

An OR circuit OR1 has its one input terminal connected to an output terminal of the AND circuit AN1 and has the other input terminal connected to a connecting point between the one-frame switch S5 and a pull-down resistor R3. Also, the OR circuit OR1 has its output terminal connected to bases of the transistors T1 and T4. That is to say, the OR circuit OR1 outputs an 'H' signal when the circuit OR1 receives the 'H' signal from the AND circuit AN1 or when the one-frame switch S5 is closed, whereby the transistors T1 and T4 are turned 'ON' to render the relay switch RL1 operative and the motor M is rotated in the normal direction.

The output terminal of the OR circuit OR1 is also connected to a base of a transistor T5 through an inverter IN3. This transistor T5 along with a constant current circuit CC, a capacitor C1, a constant voltage circuit CE and a comparator CP1 constitutes a timer circuitry. The comparator CP1 outputs an 'H' signal when a charging voltage of the capacitor C1 becomes higher than a voltage of the constant current circuit CE as the transistor T5, which short-circuits the capacitor C1 at the 'ON' state thereof, maintains an 'OFF' state for a predetermined time period. This comparator CP1 has its output terminal connected to one of the input terminals of the OR circuit OR2. The other input terminal of the OR circuit OR2 is connected through an inverter IN2 to a connecting point between the one-frame switch S5 and a pull-down resistor R3. That is, the OR circuit OR2 outputs an 'H' signal when the comparator CP1 outputs an 'H' signal or when the one-frame switch S5 is opened.

An AND circuit AN2 has its one input terminal connected to the output terminal of the OR circuit OR2 and has the other input terminal connected to the output terminal of the AND circuit AN1 through the inverter IN1. An output terminal of the AND circuit AN2 is connected to a base of the transistor T3. That is to say, the AND circuit AN 2 outputs an 'H' signal when the AND circuit AN1 outputs an 'L' (low) signal and at the same time the OR circuit OR2 outputs the 'H' signal, whereby the transistor T3 is turned 'ON' and the motor M is stopped.

On the other hand, the bases of the two transistors T2 and T3 are connected to a connecting point between the rewinding switch S6 and a pull-down resistor R4. That is, when the rewinding switch S6 is closed, the transistors T2 and T3 are both turned 'ON' to render the relay switch RL2 operative and the motor M is rotated in a reverse direction. A base of a transistor T4 is connected to a connecting point between the rewinding completion switch S7 and a pull-down resistor R5. Thus, when the rewinding completion switch S7 is closed, the transistor T4 is turned 'ON' thereby to stop the motor M which has been rotated in the reverse direction.

This rewinding completion switch S7 is disposed adjacent the film advance roller 22 and the pressure contact roller 23 in operation for transporting the film F. This switch S7 is opened by coming into contact with the film F being transported between the two rollers 22 and 23 and is closed with an absence of the film F in the transportion position. In place of the above construction, by forming both of the film advance roller 22 and the pressure contact roller 23 with an electrically conductive material, it is also possible to adapt the switch S7 to be closed as the rollers come into contact with each other in the absence of the film F therebetween and to be opened as the rollers are placed out of the mutual contact in the presence of the film F therebetween.

Various functions of the camera constructed as above will be particularly described next.

(1) a film loading function

As shown in FIG. 2, with the lid 8 of the patrone chamber 6 opened, the film patrone P is loaded with the upper patrone axis Pxt firstly guided into the patrone chamber 6. In this operation, the film exit slit Pa of the patrone P may be placed at any position peripherally of the patrone axis Px.

With the camera CA of the present invention, the film patrone P may be loaded into the patrone chamber in a different manner to be described hereinafter without contacting the film patrone P.

As shown in FIG. 8A, the film patrone P is normally accommodated in a patrone case 42 with the upper patrone axis Pxt positioned toward a lid 42a side. In the film loading operation, firstly, as shown in FIG. 8A, the camera CA is placed upside down and the lid 8 of the patrone chamber 6 is opened and then the lid 42a of the patrone case 42 is removed. Nextly, as shown in FIG. 8B, the patrone case 42 is inverted and placed over the opening 7 of the patrone chamber 6, whereby, the film patrone P, as shown in FIG. 8C, falls into the patrone chamber 6.

In either of the above procedures, when the lid 8 is closed, the film patrone P is accommodated in the patrone chamber 6 as shown in FIG. 1 and FIG. 5A. In the above operation, even if the patrone axis Px is slightly tilted when inserted into the patrone chamber 6, as the film patrone P is inserted with the lid 8 closed, the leading edge of the guide lever 16 urgedly guides the upper patrone axis Pxt toward the drive shaft 18 disposed centrally of the ceiling face 6a of the patrone chamber 6 and at the same time the guide member 12 attached to the lid 8 comes into the lower patrone axis Pxb, whereby the position of the film patrone P is corrected to permit the patrone axis Px to be disposed upright relative to the ceiling face 6a of the patrone chamber 6.

As shown in FIG. 1, when the lid 8 is closed and locked, the elastic frictional member 14 secured to the rotation preventing plate 13 comes into urged contact by the urging force of the plate spring 15 with the lower end face Pb of the film patrone P and the rotation-preventing plate 13 and the film patrone P are integratedly connected with each other within a frictional force therebetween about the patrone axis Px, whereby the film patrone P is permited to rotate only in the direction 'A' by the engagement between the sawtoothed projection 13a and the plate spring 15 as shown in FIGS. 5A through 5C.

The drive shaft 18 for the film patrone P, as being engaged into the upper patrone axis Pxt thereby to permit the plate portion 18b to come into engagement with the groove defined inside the upper patrone axis Pxt, transmits its rotational output to the patrone axis Px. A projecting portion 18a disposed at a top end of the plate portion 18b is provided for permitting the groove defined inside the upper patrone axis Pxt to come into smooth engagement with the plate portion 18b of the drive shaft 18 when the film patrone P is inserted.

If the plate portion 18b of the drive shaft 18 fails to come into engagement with the groove inside the upper patrone axis Pxt when the film patrone P is inserted, the drive shaft 18 is temporarily urged against an urging force of the spring 21 into the ceiling face 6a of the patrone chamber 6, and then comes into engagement with the groove inside the upper patrone axis Pxt when the drive shaft 18 begins to rotate. In this condition, the leading edge of the film F is by its own elasticity in elastically sliding contact with the inner wall forming the patrone chamber 6.

Referring to FIG. 1, when the film patrone P is inserted, the patrone detection pin 17 is upwardly moved against an urging force of the spring 19 whereby the film loading switch S2 is closed. Also, when the locking lever 9 is rotated to its locked position, the locking switch S3 is closed. In this condition, it is assumed that the main switch S1 is closed. And, the initial winding-up switch S4 is closed as the film frame counter 39 is in the initialized state.

Figure 7:
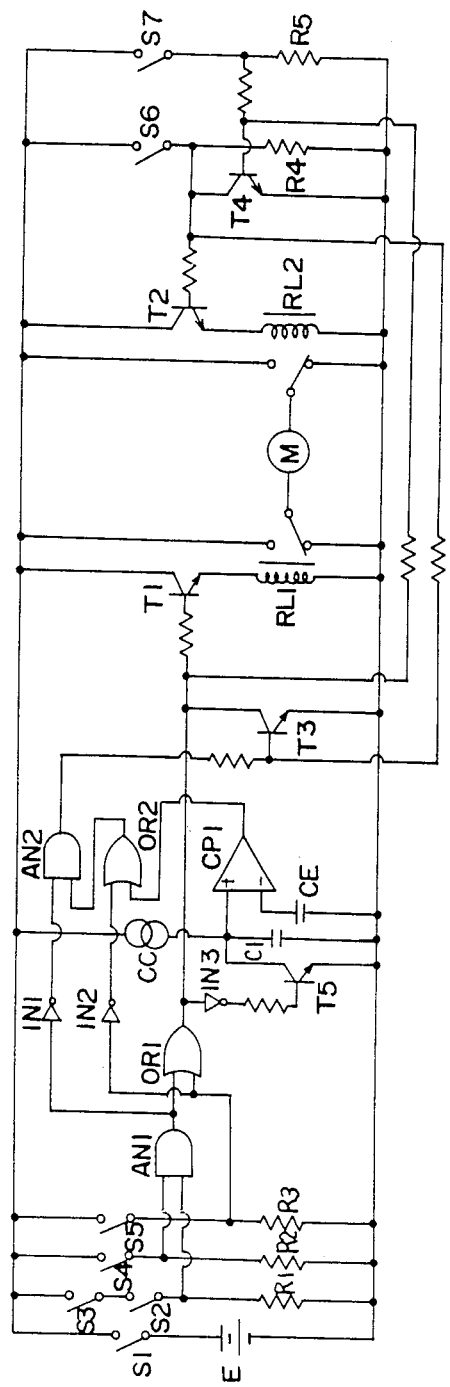
FIG. 7 is a circuit diagram of a motor drive circuitry.

Therefore, referring now to FIG. 7, the AND circuit AN1 and the OR circuit OR1 output 'H' signals to turn 'ON' the transistor T1 thereby to rotate the motor M in the normal direction. This normal rotation of the motor is maintained until the film frame counter 39 detects the first frame of the film F to open the initial winding-up switch S4 and at the same time the one-frame switch S5 is opened.

Referring to FIGS. 5A through 5C and to FIG. 6, as the motor M is rotated in the normal direction, i.e., the rotational shaft Ma is rotated in the direction 'B', the spool 29 is rotated in the direction 'A'. Also, the planetary gear G18 comes into mesh with the gear G19 and the film advance roller 22 and the drive shaft 18 are rotated in the direction 'A'.

By this rotation of the drive shaft 18 in the direction 'A', the patrone axis Px is rotated in the direction for loosening the film F. That is to say, the drive shaft 18 coming into engagement with the groove inside the upper patrone axis Pxt and a drive transmission mechanism for the drive shaft 18 together constitute a patrone rotation drive mechanism PM for rotating the film patrone P accommodated in the patrone chamber 6 in the direction for loosening the film F.

By this rotation of the patrone axis Px, the film, because of the frictional resistance with the light-shielding cloth at the film exit slit Pa of the film patrone P, extends axially inside the film patrone P to come into pressure contact with the inner wall of the film patrone P. In this condition, the patrone axis Px, the film F and the film patrone P are rotated in unison together.

As shown in FIG. 1, the lower end face Pb of the film patrone P is in contact with the elastic frictional member 14 urged by the plate spring 15; whereas, the the rotation preventing plate 13 and the plate spring 15 disposed together with the elastic frictional member 14 permit the rotation for advancing the film F, whereby the film patrone P along with the film F begins to rotate in the direction 'A' in FIG. 5A. With this rotation, the leading edge of the film F is guided through sliding contact with the guide face 6A defined over substantially all the periphery of the inner wall that forms the patrone chamber 6 to be moved in the direction 'A' in the same figure and then reaches the film outlet opening 6c defined in the patrone chamber 6.

Thereafter, as shown in FIG. 5B, the leading edge of the film F goes through the film outlet opening 6c and then is inserted between the film advance roller 22 and the pressure contact roller 23.

That is to say, the patrone rotation drive mechanism PM and the guide face 6A defined over substantially all the periphery of the patrone chamber 6 together constitute a film-insertion mechanism FI for inserting the film F into the film outlet opening 6c by rotating the same about an axis along the patrone axis Px.

On the other hand, as the film advance roller 22 is rotated in the direction 'A', the film F is transported leftwardly in the same figure. After passing between the film exposure section 25 and the film pressure plate 26, the film F reaches the spool chamber 28 and then, as shown in FIG. 5C, the film F is wound about the spool 29 in the direction 'A' along the guide lever 30.

As described hereinbefore, when the film F is wound up with the normal rotation of the motor M, the speed of the loosening of the film F off the patrone axis Px by the rotation of the drive shaft 18 is set to be slower than the transporting speed of the film F by the film advance rollers 22 and 23. Therefore, as the film winding-up operation of the film F proceeds, the loosening amount of the film F gradually decreases to be zero.

Thereafter, as the film F wound about the patrone axis Px is forcibly released therefrom by the rotation of the film advance roller 22, the drive shaft 18 is rotated at a faster speed than the rotational speed of the gear G23. However, as shown in FIG. 6, this does not cause any inconvenience as the one-way clutch 30 is provided between the the drive shaft 18 and the gear G23 for transmitting the rotational output of the gear G23 only in the direction 'A', i.e., the rotational output of the drive shaft 18 only in the direction 'B'.

By coming into engagement with a perforation of the leading edge of the film F being transported, the film-frame counting sprocket 27 starts rotating thereby operating the film frame counter 39 and the one-frame switch operational mechanism 38 as described hereinbefore. When the film frame counter 39 has detected that the leading edge for serving as the first frame of the film F has reached the film exposure section based on a counted number of perforations, the initial winding-up switch S4 is opened and in succession when the film frame counter 39 has detected a presence of the first frame of the film F at the film exposure section 25, the one-frame switch S5 is opened, whereby, referring to FIG. 7, both the AND circuit AN1 and the OR circuit OR1 output 'L' signals to turn 'ON' the transistor T3 and the motor M is stopped.

(2) a photographic operation and a film winding-up operation

After the completion of the initial winding-up operation of the film F in the aforementioned film loading operation (1), the initial winding-up switch S4 is kept opened and the output signal from the AND circuit AN1 is maintained at the 'L' level.

In this condition, if a shutter release operation is carried out by depressing a shutter release button (not shown), after an exposure operation of the film F is carried out by the shutter 24, the one-frame switch S5 is closed. Thus, referring to FIG. 7, the OR circuit OR1 outputs the 'H' signal to turn 'ON the transistor T1 and the motor M is rotated in the normal direction.

With this normal rotation of the motor M, referring now to FIG. 6, the drive shaft 18, the film advance roller 22 and the spool 29 are rotated in the direction 'A', thereby to transport the film F leftwardly in the same figure. It is to be noted here that the released shutter 24 is re-cocked by a shutter-cocking mechanism (not shown) in the above process.

On the other hand, the film-frame counting sprocket 27 is driven by the transportation of the film F and is rotated in the direction 'A', thereby operating the film frame counter 39 through the sprocket operational mechanism 37. After completion of one-frame transportation of the film F, the one-frame switch S5 is opened through the one-frame switch operational mechanism 38 and the motor M is stopped in the same manner as the aforementioned film loading operation (1).

(3) an abnormal film tension detecting operation

In the above-described film winding-up operation (2), while the 'H' signal is being output from the OR circuit OR1, the inverter IN3 outputs an 'L' signal, thus the transistor T5 is turned 'OFF'. Therefore, the capacitor C1 is charged with power supplied from the constant current circuit CC.

If the one-frame switch S5 is not opened while the winding-up condition of the film F is maintained for a predetermined time period (that is, a time period slightly longer than that normally required for winding up the film F by one-frame length), the charged voltage in the capacitor C1 increases to be higher than the voltage of the constant voltage circuit CE, whereby the output signal from the comparator CP1 is switched to 'H'. As the output signal from the AND circuit AN1 is in the state of 'L' in the above condition, the gate of the AND circuit AN2 is unblocked, thus the 'H' signal from the comparator CP1 goes through the OR circuit OR2 and then is output from the AND circuit AN2. Therefore, the transistor T3 is turned 'ON' to stop the motor M.

The above-described condition occurs when all the frames of the film F have been exposed or when it becomes impossible to transport the film because of some trouble. The reason is that the film frame counting sprocket 27 is not driven and the one-frame switch S5 is not opened after the lapse of the predetermined time period when the above situations occur.

On the other hand, when the film F is transported normally, as the one-frame switch S5 is opened within the predetermined time period, the output signal from the OR circuit OR1 is switched to 'L'. Then, since the transistor T5 is turned 'ON' through the inverter IN3, the charged voltage in the capacitor C1 is discharged whereby the capacitor C1 returns to the initialized state thereof.

(4) a film rewinding operation

When the film rewinding operation is set by operating a film rewinding lever (not shown) and the rewinding switch S6 is closed in FIG. 7, the transistor T2 is turned 'ON' to operate the relay switch RL2 and the motor M is rotated in the reverse direction. Whereby, referring now to FIG. 6, all of the drive shaft 18, the film advance roller 22 and the spool 29 are rotated in the direction 'B', thus the film F wound about the spool 29 is transported rightwardly in the same figure.

In the course of the film rewinding operation, with the rotation of the drive shaft 18, because of friction between the film F secured to the patrone axis Px and the light-shielding cloth of the film exit slit Pa the rotational output of the drive shaft 18 is transmitted to the film patrone P per se. However, the lower end face Pb of the film patrone P is in the urged contact with the elastic frictional member 14 and this frictional force is stronger than the frictional force between the film F and the light-shielding cloth. Further, since the rotation preventing plate 13 mounting the elastic frictional member 14 is prevented from the rotation in the direction for rewinding the film F by the engagement between the projection 13a thereof and the plate spring 15, the film patrone P is not rotated.

That is to say, the elastic frictional member 14, the rotation preventing plate 13 and the plate spring 15 togetherwith constitute a patrone reverse rotation preventing mechanism RI for preventing the film patrone P from being rotated in the course of film rewinding operation.

Thus, the film transported rightwardly in FIG. 6 is rewound by the patrone axis Px driven and rotated by the drive shaft 18. When all of the film F is rewound in the film patrone P, the rewinding completion switch S7 is closed, whereby, in FIG. 7, the transistor T4 is turned 'ON' and the transistor T2 is turned 'OFF' and then the motor M is stopped.

In the previous embodiment, the patrone rotation drive mechanism PM includes the drive shaft 18 coming into engagement with the groove defined inside the upper patrone axis Pxt. In addition to this, the specific construction of the patrone rotation drive mechanism PM may be conveniently varied, one example of which will be described next.

Figure 9A:
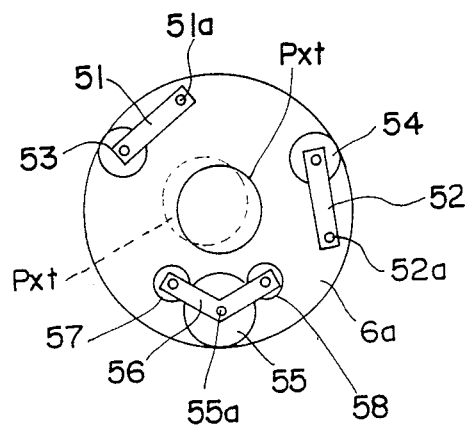
FIGS. 9A through 9C are bottom views showing another embodiment of a patrone rotational drive mechanism.
Figure 9B:
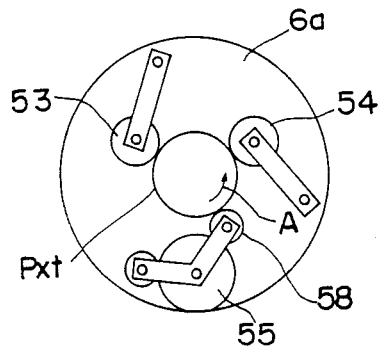
Figure 9C:
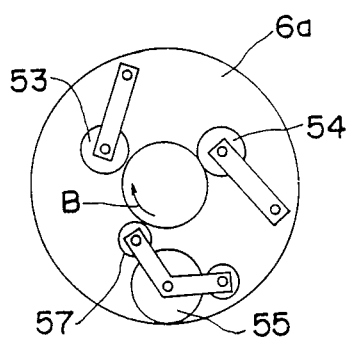

As shown in FIGS. 9A through 9C, the ceiling face 6a of the patrone chamber 6 carries a pair of support levers 51, 52 independently and rotatably supported by attaching shafts 51a, 52a, respectively. These support levers 51, 52, rotatably support at top ends thereof patrone support rollers 53, 54 respectively.

These support levers 51, 52 are linked with an action of the lid 8 of the patrone chamber 6 through a linking mechanism (not shown) so as to be placed in recessed positions thereof shown in FIG. 9A when the lid 8 is in the opened position and to be placed in functioning positions thereof shown in FIGS. 9B and 9C when the lid 8 is closed. The support levers 51, 52 are respectively urged by independently provided springs (not shown) such that when the support levers 51, 52 are placed in the functioning positions thereof the respective patrone support rollers 53, 54 laterally and elastically support the upper patrone axis Pxt, respectively.

A reference numeral 55 in the same figures denote a sun roller supported by an attaching shaft 55a and at the same time operatively connected to a drive mechanism (not shown) to be rotated in both directions. It is to be noted that this drive mechanism is substantially the same as the drive mechanism of the previous embodiment shown in FIG. 6 except that the sun roller 55 is provided in place of the drive shaft 18.

To the attaching shaft 55a for the sun roller 55 is rotatably supported a lever 56. This lever 56 rotatably supports at both free end portions thereof a pair of planetary rollers 57 and 58, which are in frictional engagement with the sun roller 55.

In operation, when the sun roller 55 is rotated in the direction 'A', as shown in FIG. 9B, the lever 56 is rotated to permit the planetary roller 58 to come into elastically urged contact with an outer periphery of the upper patrone axis Pxt, whereby a rotational output of the sun roller 55 is transmitted through the planetary roller 58 to rotate the patrone axis Px in the direction 'A'. On the other hand, when the sun roller 55 is rotated in the direction 'B', as shown in FIG. 9C, the lever 56 is rotated to permit the planetary roller 57 to come into urged contact with the outer periphery of the upper patrone axis Pxt, whereby the rotational output of the sun roller 55 is transmitted through the planetary roller 57 to rotate the patrone axis Px in the direction 'B' in the same figure.

With the above-described construction, even if the upper patrone axis Pxt is inserted slightly off the center of the patrone chamber 6 as indicated by a broken line in FIG. 9A, as the pair of support levers 51, 52 are moved from the recessed positions to the functioning positions, the patrone rollers 53, 54 push the upper patrone axis Pxt toward the center thereby to correct the positioning of the film patrone P.

It is to be noted here that the lever 56 is urged by a relatively weak urging force to be stopped at a position indicated in FIG. 9A when the sun roller 55 is not rotated. Therefore, even if the upper patrone axis Pxt of the film patrone P inserted into the patrone chamber 6 is biased toward the sun roller 55, the upper patrone axis Pxt is pushed by either of the planetary rollers 57 or 58 toward the center with the rotation of the sun roller 55.

Figure 10A:
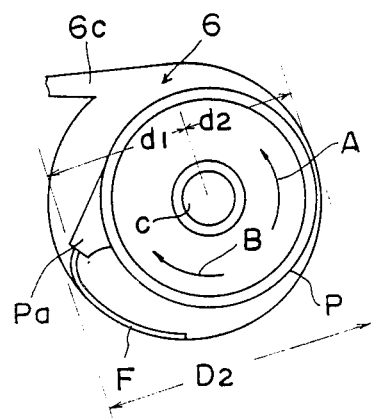
FIGS. 10A through 10C are top views showing another embodiment of the patrone chamber.
Figure 10B:
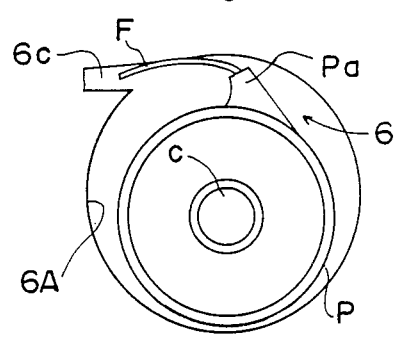
Figure 10C:
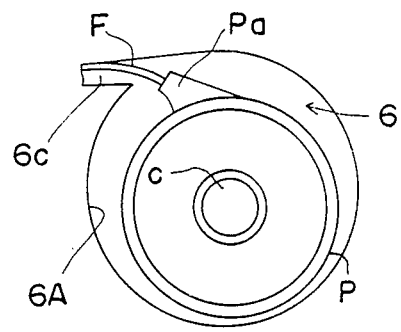
Figure 11B:
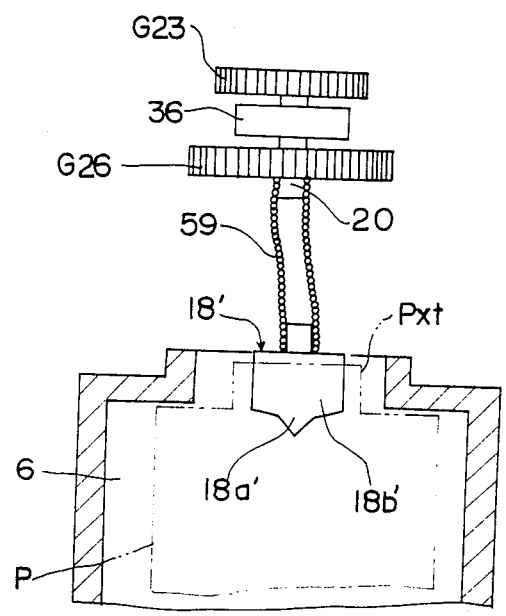
FIG. 11B is a partially detailed view showing a drive shaft for the patrone rotational drive mechanism disposed eccentrically relative to the patrone chamber.
Figure 11A:
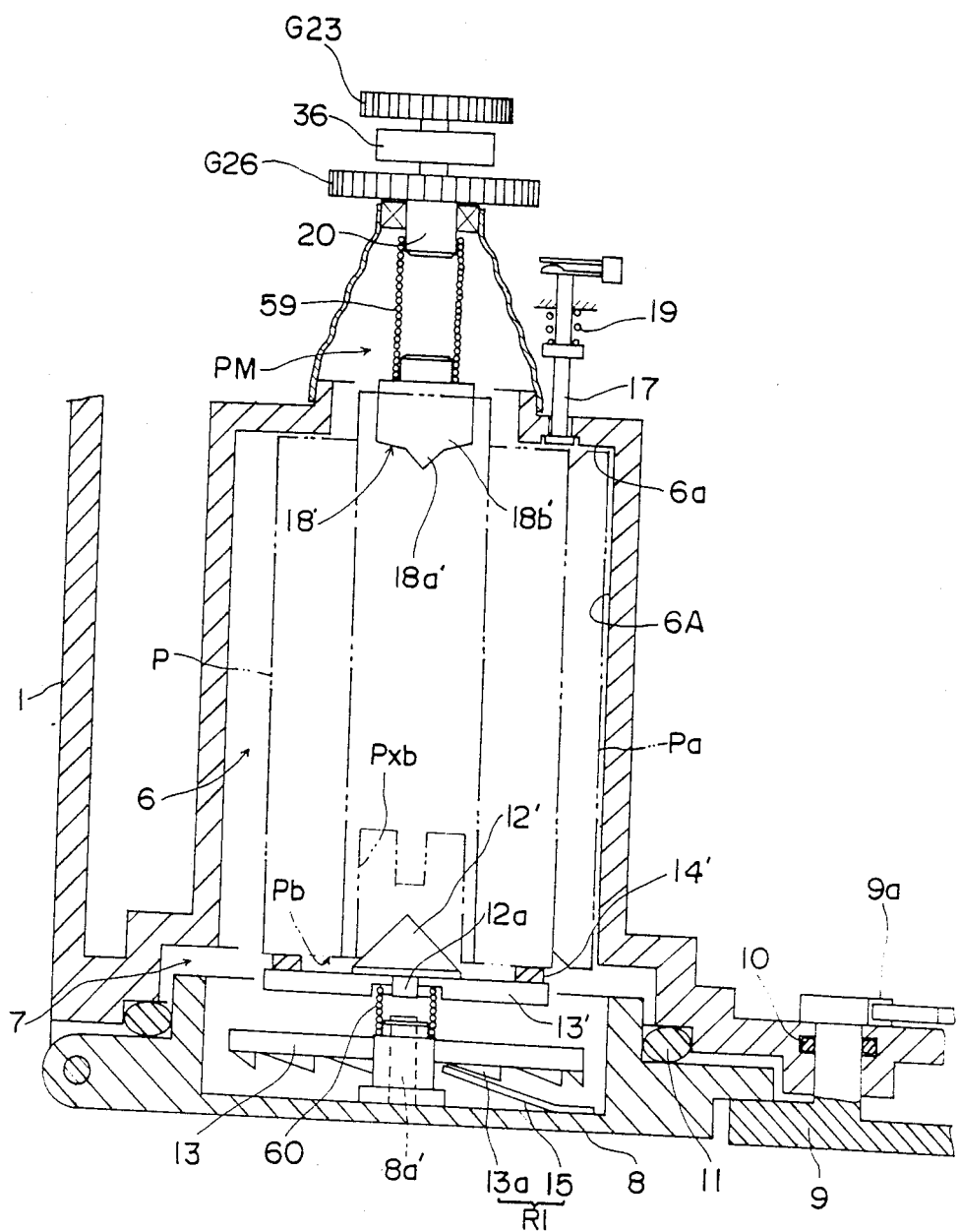
FIG. 11A is a section showing the patrone rotational drive mechanism for the patrone chamber of the embodiment shown in FIGS. 10A through 10C.

FIGS. 10 and 11A illustrate another embodiment in which the patrone chamber 6 has a different construction and at the same time the patrone rotation drive mechanism PM is constructed in accordance therewith.

As shown in FIGS. 10A through 10C, an inner radius of the patrone chamber 6 is slightly longer than a distance from an outermost edge of the film exit slit Pa across the center of the patrone axis Px to an opposing peripheral wall of the film patrone P. More particularly, if the inner radius of the patrone chamber 6 is D2, the distance from the center of the film patrone P to the outermost edge of the film exit slit Pa is d1 and the radius of the cylindrical portion of the film patrone P is d2, then:

$$2 \cdot d1 > D2 > d1 + d2$$

Therefore, the patrone axis Px is eccentrically rotated inside the patrone chamber 6 with the rotation of the film patrone P.

The drive shaft 18', which corresponds to the drive shaft 18 in the embodiment shown in FIG. 2, includes a projecting portion 18a', a plate portion 18b' having a width engageable into the upper patrone axis Pxt and the like. It is to be noted here that the same members of the present embodiment as those employed in the embodiment shown in FIG. 2 are denoted by the same reference numerals. Further, the drive shaft 18' is operatively connected through a transmission spring 59 to the drive shaft 20 connected to the gear G26.

This transmission spring 59 is erected at its free state to support the drive shaft 18'. With a loading of the film patrone P into the patrone chamber 6, the drive shaft 18' engages into the groove defined inside the upper patrone axis Pxt, the transmission spring 59 is elastically transformed as shown in FIG. 11B and the drive shaft 18' is displaced eccentrically relative to the patrone chamber 6 thereby permitting the transmission of the drive force to the patrone axis Px. This construction along with the aforementioned connecting construction between the lid 8 and the film patrone P permits the film patrone P to be rotated eccentrically relative to the patrone chamber 6.

Compared with a construction in which the film patrone P is rotated uneccentrically relative to the patrone chamber 6, this construction permits the patrone chamber 6 to be formed compact with a shorter inner radius. Further, by providing a suitable length to the inner radius of the patrone chamber 6, the patrone axis Px of the inserted film patrone P constantly covers the center C of the patrone chamber 6.

As shown in FIG. 11A, the inner wall of the lid 8 has an axis 8a' erectly mounted thereon which carries the rotation preventing plate 13 to be rotatable thereon. This rotation preventing plate 13 has its face (upper face in the same figure) connected through a spring 60 to a support plate 13' including a ring-formed elastic frictional member 14'. This elastic frictional member 14' is urged against the lower end face Pb of the film patrone P accommodated in the patrone chamber 6 with the lid 8 placed at its closed position.

Also, the support plate 13' rotatably supports a rotational axis 12a' of a conical guide member 12'. This guide member 12' engages the lower patrone axis Pxb which is not protruding with the film patrone P accommodated in the patrone chamber 6 and regulates a radial positioning of the film patrone P. The guide member 12' and the support plate 13' can be eccentrically disposed by an elastic transformation of the spring 60 inside the patrone chamber 6 thereby permitting the eccentric positioning of the film patrone P relative to the patrone chamber 6.

On the other hand, a projecting portion 18a' of the drive shaft 18' and the center of the guide member 12' are respectively disposed substantially centrally of the patrone chamber 6. Accordingly, wherever the film exit slit Pa may be positioned peripherally of the patrone axis Px when the film patrone P is inserted, the projecting portion 18a' of the drive shaft 18' is automatically guided into the upper patrone axis Pxt and at the same time a leading edge of the guide member 12' is guided into the lower patrone axis Pxb, whereby the plate portion 18b' of the drive shaft 18' and the guide member 12' come into smooth engagement with the groove defined inside the upper patrone axis Pxt and with lower patrone axis Pxb, respectively.

FIG. 10A shows a condition in which the drive shaft 18' is in engagement with the groove defined inside the upper patrone axis Pxt. Thereafter, in the same manner as the previous embodiment, when the lid 8 is closed and the drive shaft 18' is rotated in the direction 'A', the film patrone P is rotated eccentrically from the center C of the patrone chamber 6.

Accordingly, the leading edge of the film F as guided in sliding contact with the wall 6A of the patrone chamber 6, reaches the film outlet opening 6c as shown in FIG. 10B. With further rotation of the film patrone P, as shown in FIG. 10C, the leading edge of the film F passes through the film outlet opening 6c and then goes toward the film advance mechanism (now shown in FIG. 10C).

Figure 12:
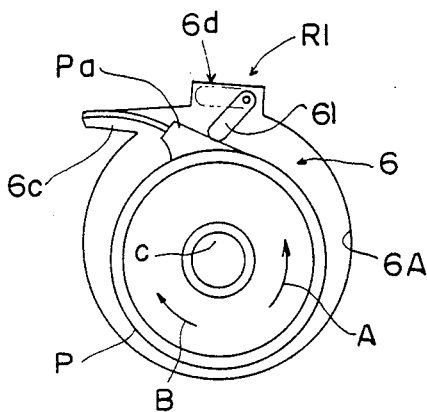
FIG. 12 is a top view showing another embodiment of a patrone reverse rotation preventing mechanism.

FIG. 12 shows another embodiment of the patrone reverse rotation preventing mechanism RI for preventing the film patrone P from being rotated in the course of the film rewinding operation.

In this embodiment, the patrone chamber 6 has the same sizes and form as in the previous embodiment shown in FIGS. 10A through 10C. And, a portion of the wall 6A of the patrone chamber 6 defines a slit concave portion 6d which accommodates a stopping lever 61.

This stopping lever 61 is pivotable between a functioning position indicated by a solid line in the same figure projecting into the patrone chamber 6 and a recessed position indicated by an alternate long and two short dash line recessed outwardly from the patrone chamber 6, such that the stopping lever 61 is moved to the functioning position when the film rewinding operation is set in accordance with an operation of the rewinding lever (not shown) linked with the rewinding switch S6.

In the film rewinding operation, the driven movement of the patrone axis Px in the direction 'B' provides a force to move the film patrone P per se in the same direction 'B'. However, since the stopping lever 61 placed at the functioning position thereof is in contact with the film exit slit Pa, the film patrone P is prevented from being rotated in the direction 'B', whereby the film F is smoothly rewound in the film patrone P.

On the other hand, this stopping lever 61 is placed at the recessed position outwardly from the patrone chamber 6 in loading or winding up the film F. Further, since this stopping lever 61 may be formed compact with its vertical thickness being only about 1.0 mm and the slit concave portion 6d needed for projecting and retracting the lever 61 may be also formed compact with its vertical width being only about 1.0 mm, these members 61 and 6d do not obstruct the transportation of the film F in the film loading and winding-up operations.

Also, it is to be noted, this stopping lever 61 may be provided also to the patrone chamber 6 of the embodiment shown in FIGS. 5A through 5C.

In the aforementioned embodiments, the upper patrone axis Pxt of the film patrone P is rotated in the direction for loosening the film in order to rotate the film patrone P inside the patrone chamber 6. In place of this, it is also possible to adapt the the opposite lower patrone axis Pxb to be rotated in the direction for loosening the film F.

Moreover, in place of the construction in which the rotation of the patrone axis Px loosens the film F and the contact between the film F and the inner wall of the film patrone P rotates the film patrone P, it is also possible to adapt the film patrone P per se to be directly driven and rotated. For example, though not shown, as the lower end face Pb of the film patrone P is in urged contact with the elastic frictional member 14 in the embodiment shown in Fig. 1, a circular plate may be provided instead of the rotation preventing plate 13 such that this circular plate is operatively connected with the motor M through a wire and the like.

Figure 13:
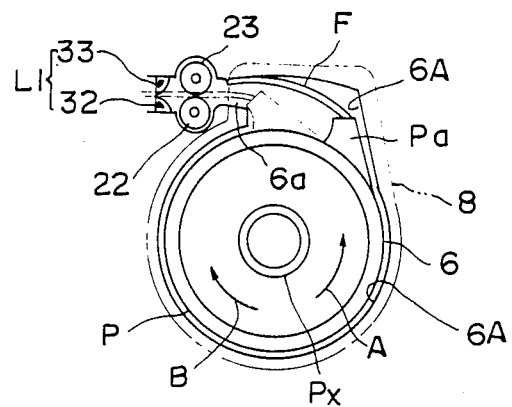
FIGS. 13 and 14 are bottom views showing still other embodiments of the patrone chamber.

FIG. 13 shows still another embodiment of the patrone chamber 6.

In this embodiment, the patrone chamber 6 is formed by being surrounded with a wall 6A formed substantially along the outer periphery of the film patrone P.

Also, the vicinity of the film outlet opening 6c is laterally extended to permit the film exit slit Pa of the film patrone P to be rotated by predetermined angle.

In loading the film F, as indicated by the solid line in the same figure, the film patrone P is inserted into the patrone chamber 6 such that the film exit slit Pa is aligned with a contact face 6Aa. Then, in the same manner as in the aforementioned embodiment, when the patrone axis Px is rotated in the direction 'A' in the figure, the film patrone P is also rotated in the same direction 'A'. The leading edge of the film F is held between the film advance roller 22 and the pressure contact roller 23. Thereafter, with the rotation of the film advance roller 22, the film F is transported leftwardly in the figure and goes through the light-blocking means including the pair of light-blocking members 32, 33 and then reaches the film exposure section 25. A position of the film patrone P in the above condition is indicated by the broken line in the figure.

In the case of the present embodiment, it is preferred that the film F projecting from the film exit slit Pa before being loaded have a length to permit the leading edge thereof to be disposed adjacent the film advance roller 22 when the film exit slit Pa comes into alignment with the contact face 6Aa. Also, in this embodiment, as the patrone chamber 6 has its wall 6A formed substantially along the periphery of the film patrone P, it is possible to form the patrone chamber 6 compact. And, in accordance therewith, it is also possible to form compact the lid 8 for the opening 7 for loading and unloading the film patrone P as indicated by an alternate long and two short dashes in the figure.

Further, with the construction of the present embodiment, the patrone reverse rotation preventing mechanism RI is not necessary since the contact face 6Aa serves to prevent the film patrone P from being rotated in the direction 'B' in rewinding the film F.

Figure 14:
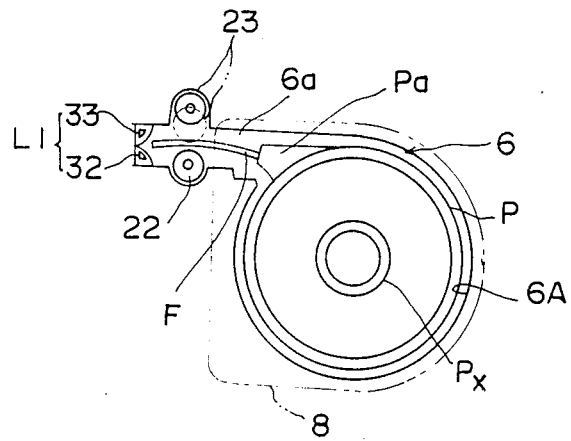

FIG. 14 shows still another embodiment of the patrone chamber 6.

In this embodiment, as the patrone chamber 6 has substantially all of its guide wall 6A formed along the outer periphery of the film patrone P, the patrone chamber 6 is formed still more compact. Further, the lid 8 for the opening 7 of the patrone chamber 6 is also formed compact as indicated by an alternate long and two short dashes in the same figure.

In this embodiment, the film advance roller 22 constituting the film advance mechanism FT has the same construction as the embodiment shown in FIGS. 5A through 5C. On the other hand, the pressure contact roller 23 is supported to be movable between a recessed position indicated by a solid line and a functioning position indicated by an alternate long and two short dashes, respectively. This pressure contact roller 23 is linked with opening and closing operations of the lid 8 for the patrone chamber 6, such that the pressure contact roller 23 is moved to the functioning position when the lid 8 is closed and is moved to the recessed position when the lid 8 is opened.

In loading the film F, the lid 8 is opened and the film patrone P is inserted along the patrone chamber 6. In this operation, by slightly bending the film F through its own elasticity to be passed through the opening 7 and then by resilience of the film F, the film F is held between the film advance roller 22 and the pressure contact roller 23. Thereafter, when the lid 8 is closed, the film advance roller 22 is moved to its functioning position to hold the film F therebetween and then with the rotation of the film advance roller 22, the film F is transported leftwardly in the same figure and goes through the light-blocking means including the light-blocking members 32 and 33 and then reaches the film exposure section 25.

In this embodiment, it is to be noted, it is not needed to rotate the film patrone P inside the patrone chamber 6 in the film loading operation, thus the patrone rotation drive mechanism PM is not necessary. Also, the patrone reverse rotation preventing mechanism RI is not necessary either since the film patrone P is not rotated relative to the patrone chamber 6.

In the previous embodiments, the opening 7 for loading and unloading the film patrone P is defined in the lower end face of the patrone chamber 6. In place of this, though not shown, this opening 7 may be defined in a side face of the patrone chamber 6. That is to say, the positioning of this opening 7 may be conveniently varied peripherally of the patrone chamber 5 (i.e. in any one of all the faces constituting the periphery of the patrone chamber 6 such as a bottom face, the ceiling face, the side face, etc.).

Also, in the previous embodiments, the light-blocking means is constituted by the pair of light-blocking members. In place of this, the light-blocking means may be constituted by the film advance roller 22 and the pressure contact roller 33. Further, this light-blocking means may be constituted by curving the transportation passage of the film F.

We claim:

1. A water-resistant photographic camera having a patrone chamber for accommodating a film patrone including an axis around which a film is wound in a predetermined direction, comprising:

a camera body including an opening exposing only said patrone chamber thereby allowing a loading of said film patrone into said patrone chamber in a direction along an axis of said film patrone;

a light-blocking lid for openably and closably covering said opening; and a sealing member held between a peripheral edge portion of said opening and said light-blocking lid and adapted for sealing said patrone chamber watertight.

2. A water-resistant photographic camera as defined in claim 1, further comprising:

a film exposure section for exposing the film taken out of said patrone;

a rotational drive mechanism for rotating said patrone thereby rotating a leading edge of said film in said predetermined direction about an axis along said patrone axis; and a film insertion mechanism for inserting said leading edge into a film outlet opening extending from said patrone chamber to said film exposure section with the rotation of said film.

3. A water-resistant photographic camera as defined in claim 1, further comprising:

a film exposure section for exposing the film taken out of said film patrone;

a rotational drive mechanism for rotating the film in said predetermined direction; and a guide face provided over substantially all of the periphery of said patrone chamber and adapted for guiding a leading edge of the film to a film outlet opening of said exposure section with the rotation of said film patrone in said predetermined direction.

* * * * *